(12) United States Patent
Mao

(10) Patent No.: US 10,281,995 B2
(45) Date of Patent: May 7, 2019

(54) WEARABLE DEVICE AND TOUCH PEN

(71) Applicant: BOE TECHNOLOGY GROUP CO., LTD., Beijing (CN)

(72) Inventor: Defeng Mao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 63 days.

(21) Appl. No.: 15/306,958

(22) PCT Filed: Feb. 23, 2016

(86) PCT No.: PCT/CN2016/074318
§ 371 (c)(1),
(2) Date: Oct. 26, 2016

(87) PCT Pub. No.: WO2017/036105
PCT Pub. Date: Mar. 9, 2017

(65) Prior Publication Data
US 2017/0269720 A1    Sep. 21, 2017

(30) Foreign Application Priority Data

Sep. 1, 2015    (CN) .......................... 2015 1 0552988

(51) Int. Cl.
*G04G 21/00*    (2010.01)
*G06F 1/16*    (2006.01)
(Continued)

(52) U.S. Cl.
CPC ......... *G06F 3/03545* (2013.01); *G04G 17/00* (2013.01); *G06F 1/163* (2013.01); *G06F 3/041* (2013.01); *G06F 2200/1632* (2013.01)

(58) Field of Classification Search
USPC ....................................................... 345/173
See application file for complete search history.

(56) References Cited

U.S. PATENT DOCUMENTS 1,603,044 A * 10/1926 Gise ...................... A44C 5/0046
                                                                    15/224
5,625,606 A *  4/1997 Openiano ............ B43K 29/087
                                                                     368/10
(Continued)

FOREIGN PATENT DOCUMENTS

CN    1113017    12/1995
CN    2622763     6/2004
(Continued)

OTHER PUBLICATIONS

Written Opinion of the International Searching Authority from corresponding PCT Application No. PCT/CN2016/074318, dated Jun. 8, 2016 (4 pages).
(Continued)

*Primary Examiner* — Chineyere D Wills-Burns
(74) *Attorney, Agent, or Firm* — Harness, Dickey & Pierce, P.L.C.

(57) ABSTRACT

The invention relates to a wearable device and touch pen, belonging to the field of wearable technology. The wearable device comprises a fastening strap and a wearable device body connected to the fastening strap. The fastening strap is provided with at least one fastening member, each fastening member being configured to fasten a touch pen to the fastening strap. The touch pen is configured for performing a touch operation on a touch screen of the wearable device body. The fastening strap and the wearable device body are capable of forming an enclosed circle. The present invention solves the problem of low precision of touch operations on the touch screen of the wearable device body, improving the precision of touch operations, and is applicable to wearable devices.

17 Claims, 8 Drawing Sheets

(51) Int. Cl.
*G06F 3/041* (2006.01)
*G06F 3/0354* (2013.01)
*G04G 17/00* (2013.01)

(56) References Cited

U.S. PATENT DOCUMENTS

| | | | | |
|---|---|---|---|---|
| 5,703,626 | A * | 12/1997 | Itoh | G06F 1/1626 |
| | | | | 178/19.01 |
| 2009/0069045 | A1 * | 3/2009 | Cheng | H02J 7/0042 |
| | | | | 455/556.1 |
| 2011/0291999 | A1 * | 12/2011 | Liang | B43K 23/06 |
| | | | | 345/179 |
| 2013/0135220 | A1 * | 5/2013 | Alameh | G06F 3/041 |
| | | | | 345/173 |
| 2016/0007697 | A1 * | 1/2016 | de Jong | A44C 5/2071 |
| | | | | 361/679.03 |
| 2016/0349790 | A1 * | 12/2016 | Connor | G06F 1/1694 |
| 2016/0363957 | A1 * | 12/2016 | Stroetmann | G06F 1/163 |
| 2017/0079386 | A1 * | 3/2017 | de Iuliis | A44C 5/12 |
| 2017/0235331 | A1 * | 8/2017 | VanDuyn | G06F 1/163 |
| | | | | 361/679.03 |
| 2017/0235341 | A1 * | 8/2017 | Huitema | G06F 1/163 |
| | | | | 361/679.03 |

FOREIGN PATENT DOCUMENTS

| | | |
|---|---|---|
| CN | 201084120 | 7/2008 |
| CN | 101598979 | 12/2009 |
| CN | 204378100 | 6/2015 |
| CN | 104793762 | 7/2015 |
| CN | 105242797 | 1/2016 |

OTHER PUBLICATIONS

Office Action from corresponding Chinese Application No. 201510552988.7 dated Aug. 21, 2017 (9 pages).

* cited by examiner

WEARABLE DEVICE AND TOUCH PEN

FIELD OF TECHNOLOGY

The present invention relates to the field of wearable technology, and in particular to a wearable device and touch pen.

BACKGROUND

With the rapid development of the technology of mobile telecommunications, more and more electronic devices, such as wearable devices, have the function of mobile telecommunications. Wearable devices arouse a lot of interest for their characteristics of simplicity, quickness and humanization.

In the prior art, a wearable device includes a fastening strap and a wearable device body connected to the fastening strap. When it is in use, a user performs touch operations using his finger on a touch screen of the wearable device body, so as to acquire various types of information such as time, weather, news and entertainment from the Internet.

The small size of the touch screen of a wearable device body may cause difficulty to touch operations. Thus, the precision of touch operations is relatively low.

SUMMARY OF THE INVENTION

In order to solve the problem of low precision of touch operations on the touch screen of a wearable device body, the present invention provides a wearable device and touch pen. The solution is as follows:

According to a first aspect of the present invention, there is provided a wearable device, which comprises a fastening strap and a wearable device body connected to the fastening strap;

the fastening strap is provided with at least one fastening member each configured to fasten a touch pen to the fastening strap, the touch pen is configured for performing a touch operation on a touch screen of the wearable device body, the fastening strap and the wearable device body being capable of forming an enclosed circle.

Optionally, the fastening member is a tubular structure and its side is fixedly attached to the fastening member, the inner diameter of the fastening member being greater than or equal to the outer diameter of the touch pen, such that the touch pen is capable of being inserted into the fastening member.

Optionally, the fastening member is made of elastic material.

Optionally, the fastening member comprises two clamping members each fixedly attached to the fastening strap, the touch pen being capable of being clamped to the clamping members.

Optionally, the wearable device is a watch, the fastening strap is a watchband, and the wearable device body is a watch body;

the watchband comprises two watchband sections which are respectively connected to the watch body, the watchband sections and the watch body being capable of forming an enclosed circle.

Optionally, the wearable device further comprises a watch body housing;

each of the watchband sections has an end connected to the watch body housing, and the watch body housing is configured to receive the watch body.

Optionally, at least two nested grooves are provided within the watch body housing, the heights of the at least two nested grooves decrease from outward to inward in the watch body housing, each of the grooves is enclosed by a sidewall and a bottom surface of the watch body housing, at least two watch bodies of different sizes are disposed within the watch body housing through the at least two nested grooves.

Optionally, the watch body housing is an axial symmetric structure, the side of the watch body housing is provided with two clamping slots symmetrical with respect to an axial section of the watch body housing;

each of the watchband sections has an end provided with a protrusion capable of being clamped into the clamping slot, such that the watch body housing and the watchband sections are movably connected.

Optionally, the clamping slot is a tubular structure with an opening in the side, and the protrusion is a cylindrical structure, the inner diameter of the clamping slot being greater than or equal to the outer diameter of the protrusion;

the clamping slot is provided with a pin and the protrusion is provided with a pin hole, the pin being capable of being inserted into the pin hole.

Optionally, the clamping slot is a tubular structure with an opening in the side, and the protrusion is a cylindrical structure, the inner diameter of the clamping slot being greater than or equal to the outer diameter of the protrusion;

a first magnet is provided on the inner surface of the clamping slot, and a second magnet is provided on the outer surface of the protrusion, the polarity of the first magnet being opposite to that of the second magnet.

Optionally, a transparent protective cover is snapped on the watch body housing.

According to a second aspect of the present invention, there is provided a touch pen, which is fastened to a fastening strap of a wearable device through at least one fastening member, the at least one fastening member is provided on the fastening strap, the touch pen is configured for performing a touch operation on a touch screen of a wearable device body of the wearable device.

Optionally, the touch pen has an end provided with a clamping member capable of being clamped to the fastening member.

Optionally, the touch pen comprises n pen sections, where n is greater than or equal to 2, any two adjacent pen sections are foldably connected, the length of the folded touch pen is capable of being greater than or equal to the length of the longest pen section among the n pen sections, the folded touch pen is capable of being fastened to the fastening strap through any of at least one fastening member.

Optionally, the fastening strap is provided with m fastening members, the touch pen comprises n pen sections, n being greater than or equal to 2, any two adjacent pen sections are detachably connected, the n pen sections are capable of being fastened to the fastening strap through the m fastening members respectively, where n is less than or equal to m.

Optionally, after receiving a rotation signal, the touch pen is capable of changing its resistance and adjusting its stroke function, the rotation signal being a signal generated in a rotation operation at the connection of any two adjacent pen sections of the touch pen, the stroke function being a function of variation in thickness, a function of variation in color or a function of erasing track of a stroke of the touch pen.

According to a third aspect of the present invention, there is provided a touch pen, which comprises n pen sections, n being greater than or equal to 2, wherein the touch pen is configured for performing a touch operation on a touch screen of a wearable device body of a wearable device.

Optionally, any two adjacent pen sections can be foldably connected, the length of the folded touch pen is greater than or equal to the length of the longest pen section among the n pen sections.

Optionally, any two adjacent pen sections are detachably connected.

Optionally, after receiving a rotation signal, the touch pen is capable of changing its resistance and adjusting its stroke function, the rotation signal being a signal generated during a rotation operation at the connection of any two adjacent pen sections of the touch pen, the stroke function being a function of variation in thickness, a function of variation in color or a function of erasing track of a stroke of the touch pen.

The present invention provides a wearable device and touch pen. This wearable device comprises a fastening strap and a wearable device body attached to the fastening strap. The fastening strap is provided with at least one fastening member, each fastening member being able to fasten the touch pen to the fastening strap. The touch pen can perform a touch operation on a touch screen of the wearable device body of the wearable device. Compared with the prior art, the difficulty of touch operations on a small touch screen is reduced, thus improving the precision of touch operations.

It is to be noted that the above general description and the detailed description hereafter are merely exemplary and illustrative, and not to limit the present invention.

BRIEF DESCRIPTION OF DRAWINGS

In order to describe more clearly the technical solution in embodiments of the present invention, the drawings required in the description of the embodiments will be introduced briefly. Apparently, the drawings described below are merely some embodiments of the present invention. For an ordinary skilled person in the art, other drawings may be obtained based on these drawings without creative work.

FIG. 2-1 is a structural schematic diagram of a fastening member and a fastening strap provided in an embodiment of the present invention;

FIG. 2-2 is a structural schematic diagram of another fastening member and a fastening strap provided in an embodiment of the present invention;

FIG. 3-1 is a structural schematic diagram of a fastening member provided in an embodiment of the present invention;

FIG. 3-2 is a structural schematic diagram of another fastening member provided in an embodiment of the present invention;

FIG. 4-1 is a structural schematic diagram of a watch provided in an embodiment of the present invention;

FIG. 4-2 is a structural schematic diagram of another watch provided in an embodiment of the present invention;

FIG. 7-1 is a side view of another connection between a watch body housing and a watchband section provided in an embodiment of the present invention;

FIG. 7-2 is a three dimensional view of another watch body housing and a watchband section provided in an embodiment of the present invention;

FIG. 8-1 is a side view of yet another watch body housing and a watchband provided in an embodiment of the present invention;

FIG. 8-2 is a three dimensional view of yet another watch body housing and a watchband provided in an embodiment of the present invention;

FIGS. 11-1 and 11-2 are schematic diagrams of a touch pen having a foldable structure provided in an embodiment of the present invention;

Specific embodiments of the present invention have been illustrated by the above drawings and will be described in further detail hereafter. The drawings and textual description are not used for limiting the inventive concept of the present invention in any way, but for illustrating the present invention for those skilled in the art with reference to specific embodiments.

DETAILED DESCRIPTION

The objects, solutions and advantages of the present invention will become clearer by describing the implementation of the present invention in further detail with reference to the drawings.

Figure 1:
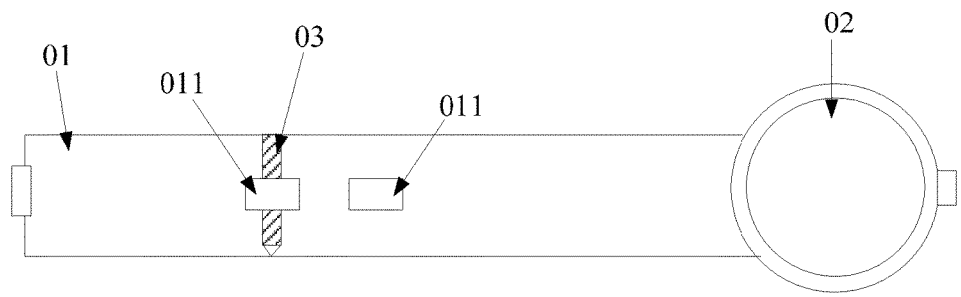
FIG. 1 is a structural schematic diagram of a wearable device provided in an embodiment of the present invention.

As shown in FIG. 1, an embodiment of the present invention provides a wearable device. The wearable device comprises a fastening strap 01 and a wearable device body 02 connected to the fastening strap 01. The fastening strap 01 is provided with at least one fastening member 011. Each fastening member is used for fastening a touch pen 03 to the fastening strap 01. The touch pen 03 is used for performing a touch operation on a touch screen of the wearable device body 02. The fastening strap 01 and the wearable device body 02 can form an enclosed circle.

In summary, an embodiment of the present invention provides a wearable device. The wearable device comprises a fastening strap and a wearable device body connected to the fastening strap. The fastening strap is provided with at least one fastening member. Each fastening member can fasten a touch pen to the fastening strap. The touch pen can perform a touch operation on a touch screen of the wearable device body. Compared with the prior art solutions, the solution of the present invention reduce the difficulty of a touch operation on a small touch screen, therefore improving the precision of a touch operation.

Figures 1, 2:
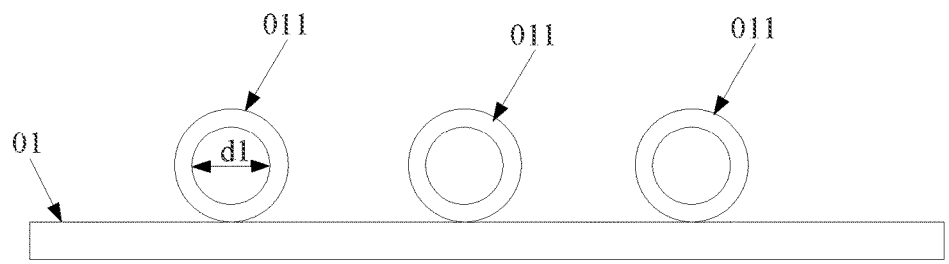
Figure 2:
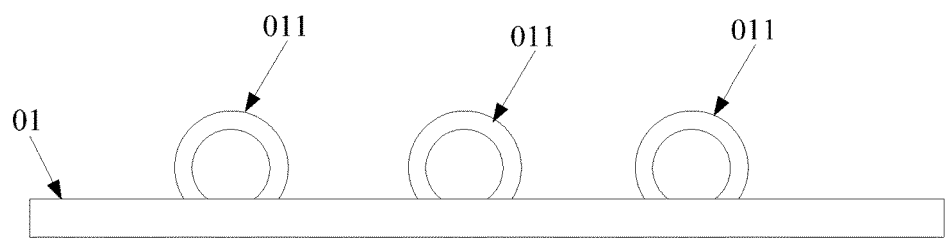

Optionally, as shown in FIG. 2-1, the fastening member 011 is a tubular structure. The side of the fastening member 011 is fixedly connected to the fastening strap 01. The inner diameter d1 of the fastening member 011 is greater than or equal to the outer diameter of the touch pen (not shown) which can be inserted into the fastening member. For example, the fastening member 011 may be made of elastic material. FIG. 2-1 is a schematic diagram of a fastening member into which a touch pen has been inserted. The fastening member of a tubular structure may be connected to the fastening strap as shown in FIG. 2-1, in which the entire touch pen is inserted into the tubular structure of the fastening member. Alternatively, the fastening member of a tubular structure may be connected to the fastening strap as shown in FIG. 2-2, in which the touch pen is inserted into a structure enclosed by the fastening member 011 and the fastening strap 01. FIGS. 2-1 and 2-2 show a side view of the fastening strap and the fastening member.

Figures 1, 3:
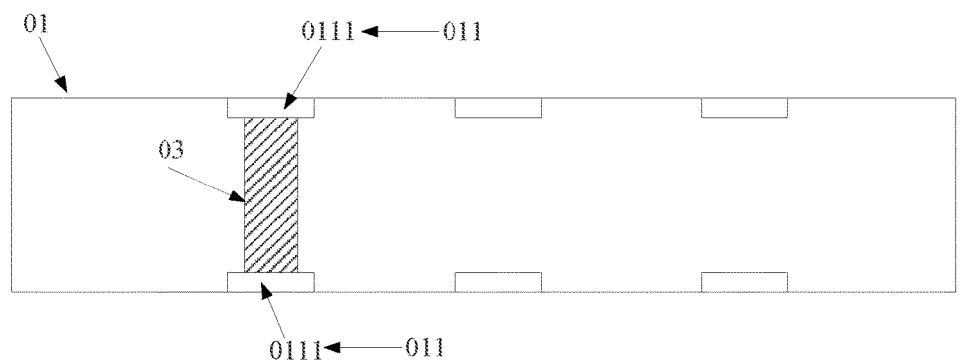
Figures 2, 3:
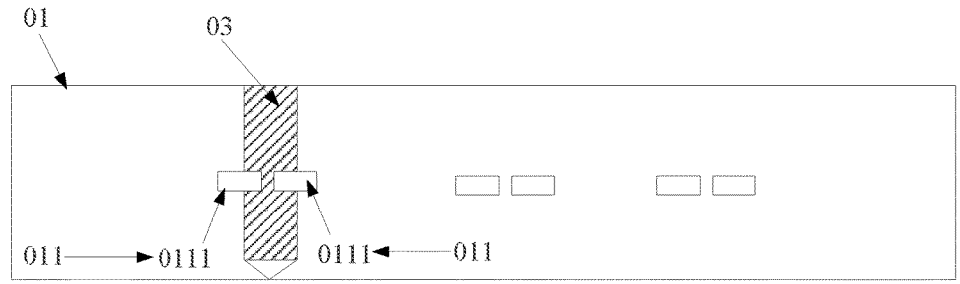

Optionally, as shown in FIG. 3-1, the fastening member 011 comprises two clamping members 0111, each clamping member 0111 is fixedly attached with the fastening strap 01. The touch pen 03 can be clamped to the two clamping members. For example, the two clamping members may be fixed to both edges of the fastening strap, as shown in FIG. 3-1. The two clamping members are clamped to the opposite ends of the touch pen 03. Alternatively, the two clamping members may also be fixed to the middle of the fastening strap, as shown in FIG. 3-2, in which the two clamping members 0111 are clamped to the middle of the touch pen 03. In FIG. 3-2, the fastening strap is denoted as 01, and the fastening member is denoted as 011. Alternatively, the fastening member may comprise more than 2 clamping members. The number, shape and position of the clamping members are not limited by embodiments of the present invention.

Figures 1, 4:
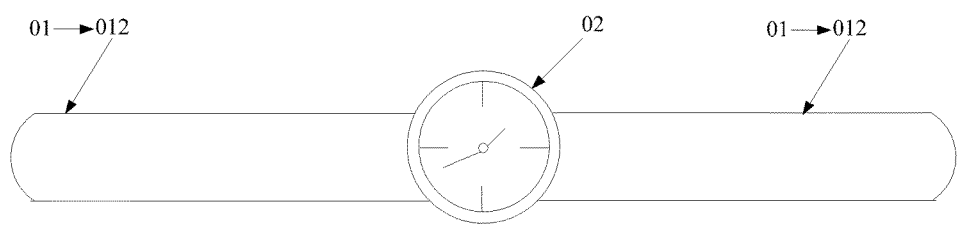
Figures 2, 4:
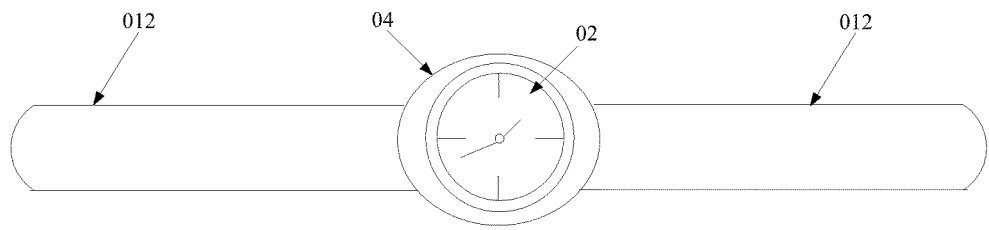

Optionally, the wearable device is a watch, the fastening strap 01 is a watchband, and the wearable device body 02 is a watch body. As shown in FIG. 4-1, the watchband comprises two watchband sections 012, each being connected to the watch body respectively. The two watchband sections and the watch body can form an enclosed circle.

The wearable device may also comprise a housing for the wearable device body. As shown in FIG. 4-2, when the wearable device is a watch, it further comprises a watch body housing 04. Each of the watchband sections 12 has an end connected to the watch body housing 04, in which the watch body 02 may be placed.

Further optionally, at least two nested grooves are provided within the watch body housing. The heights of the at least two nested grooves decrease from outward to inward in the watch body housing. Each groove is enclosed by a sidewall and a bottom surface of the watch body housing. At least two watch bodies of different sizes may be placed within the watch body housing through the at least two nested grooves.

Figure 5:
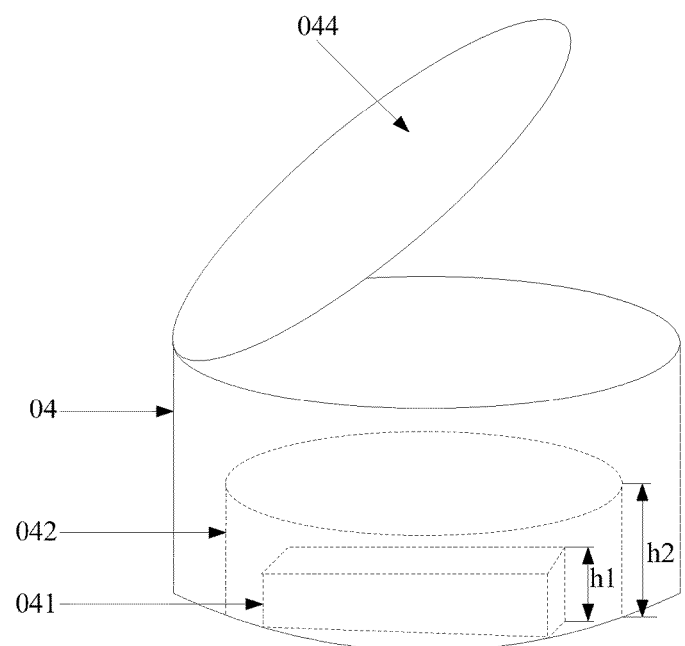
FIG. 5 is a structural schematic diagram of a watch body housing provided in an embodiment of the present invention.

FIG. 5 is a structural schematic diagram of the watch body housing 04 provided with two nested grooves. As shown in FIG. 5, the two grooves in the watch body housing are groove 041 and groove 042 respectively. The groove 041 is nested inside the groove 042 and has a height h1 less than the height h2 of the groove 042. The grooves 041 and 042 are enclosed by the sidewalls and bottoms of the watch body housing 04. Two watch bodies of different sizes may be placed within the groove 041 and the groove 042. This watch body housing may solve the problem that a watchband in the prior art can hardly be compatible with watch bodies of different sizes, achieving the effect that one watchband can receive at least two watch bodies of different sizes.

It should be noted that, the watch body housing and the grooves may have any structure, which is not limited by embodiments of the present invention. As shown in FIG. 5, the watch body housing 04 is a cylinder which is provided with a cavity therein and the outer surface of which has no top surface. The groove 041 is a cuboid which is provided with a cavity therein and has no top surface. The groove 042 is a cylinder which is provided with a cavity therein and has no top surface. Alternatively, the watch body housing 04 may also be a cuboid provided with a cavity therein, the groove 041 may also be a cylinder provided with a cavity therein, and the groove 042 may also be a cuboid provided with a cavity therein.

Figure 6:
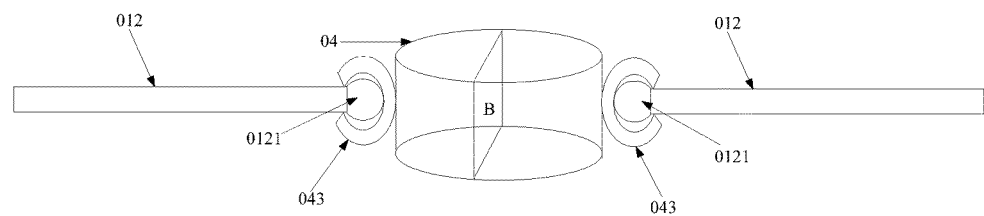
FIG. 6 is a structural schematic diagram of a connection between a watch body housing and a watchband section provided in an embodiment of the present invention.

As shown in FIG. 6, in order to have the watch body and the watchband connected, the watch body housing 04 is an axial symmetric structure. The side of the watch body housing 04 is provided with two clamping slots 043 symmetrical with respect to an axial section B of the watch body housing 04. Each watchband section 012 has an end provided with a protrusion 0121. The protrusion 0121 may be clamped into the clamping slot 043, such that the watch body housing 04 and the watchband sections 012 are movably connected. FIG. 6 is a side view of the watch body housing and the watchband.

Figures 1, 7:
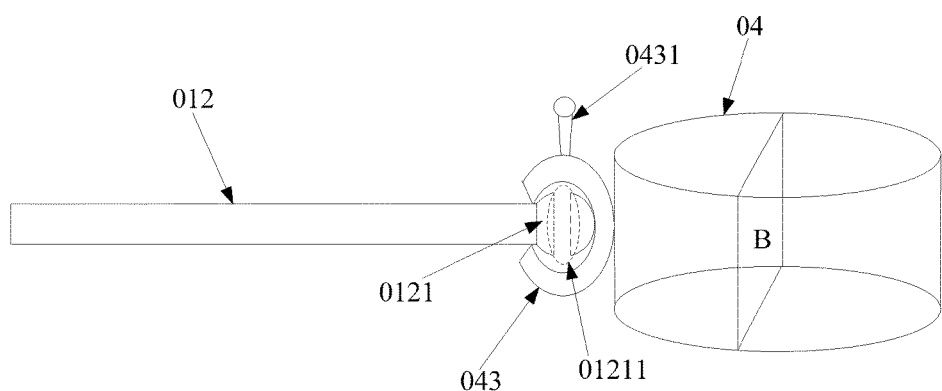
Figures 2, 7:
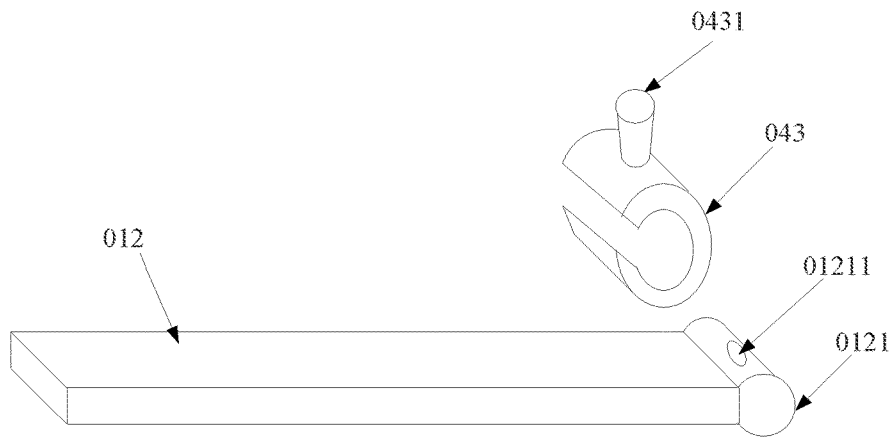

In order to connect the watch body and the watchband more firmly, optionally as shown in FIG. 7-1, the clamping slot 043 is a tubular structure having an opening in the side. The protrusion 0121 is a cylindrical structure. The inner diameter of the clamping slot 043 is greater than or equal to the outer diameter of the protrusion 0121, ensuring that the protrusion 0121 can be clamped into the clamping slot 043. The clamping slot 043 is provided with a pin 0431. The protrusion 0121 is provided with a pin hole 01211. The pin 0431 may be inserted into the pin hole 01211. The specific process of clamping may be as follows: the protrusion 0121 of each watchband section is inserted into the clamping slot 043, the pin 0431 on the clamping slot 043 is inserted into the pin hole 01211 of the protrusion 0121, so as to effectively avoid shaking from side to side of the watchband. For example, the pin 0431 may be a conical structure. The structure of the pin 0431 is identical to that of the pin hole 01211. Alternatively, the pin may also be other structures, such as cylinder or cuboid. The structure of the pin may be designed according to actual requirements. FIG. 7-1 is a side view of the clamping slot and the protrusion, where the watchband section is denoted as 012. FIG. 7-2 is a three dimensional view of the clamping slot and the protrusion in FIG. 7-1. In FIG. 7-2, the watchband section is denoted as 012, the protrusion is denoted as 0121, the pin hole is denoted as 01211, the clamping slot is denoted as 043, and the pin is denoted as 0431.

Figures 1, 8:
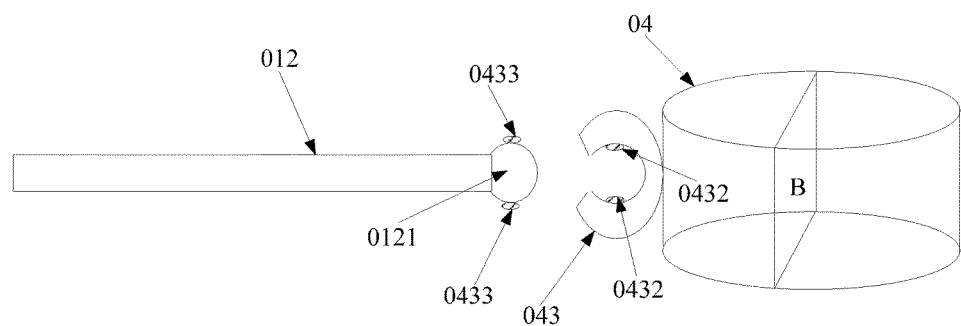
Figures 2, 8:
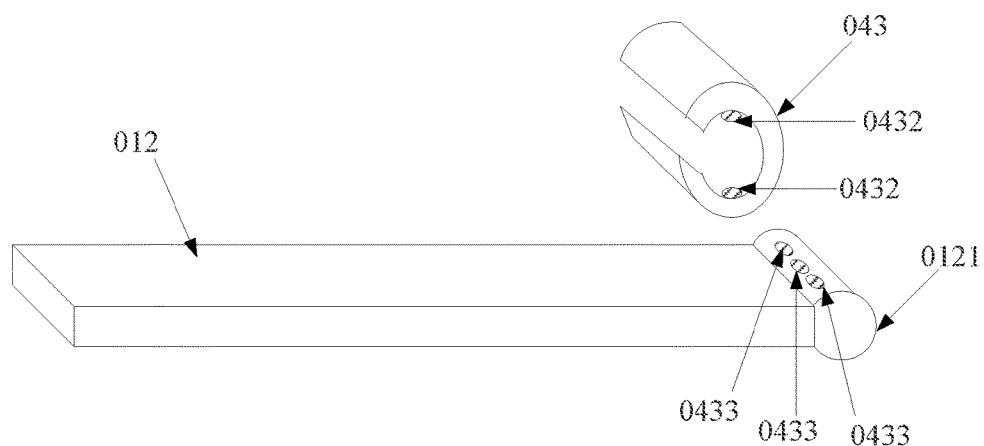

Optionally, as shown in FIG. 8-1, the clamping slot 043 is a tubular structure with an opening in the side. The protrusion 0121 is a cylindrical structure. The inner diameter of the clamping slot 043 is greater than or equal to the outer diameter of the protrusion 0121. A first magnet 0432 is provided on the inner surface of the clamping slot 043. A second magnet 0433 is provided on the outer surface of the protrusion 0121. The polarity of the first magnet 0432 is opposite to the polarity of the second magnet 0433, ensuring a stable connection between the clamping slot 043 and the protrusion 0121. Therein, the location of the first magnet on the inner surface of the clamping slot, the location of the second magnet on the outer surface of the protrusion, the number and shape of the first and second magnets may be determined according to actual requirements, which are not limited in embodiments of the present invention. In FIG. 8-1, the watch body housing is denoted as 04, and the watchband section is denoted as 012. FIG. 8-1 is a side view of the clamping slot and the protrusion. FIG. 8-2 is a three dimensional view of the clamping slot and the protrusion in FIG. 8-1. In FIG. 8-2, the watchband section is denoted as 012, the protrusion is denoted as 0121, the second magnet is denoted as 0433, the clamping slot is denoted as 043, and the first magnet is denoted as 0432.

Figure 9:
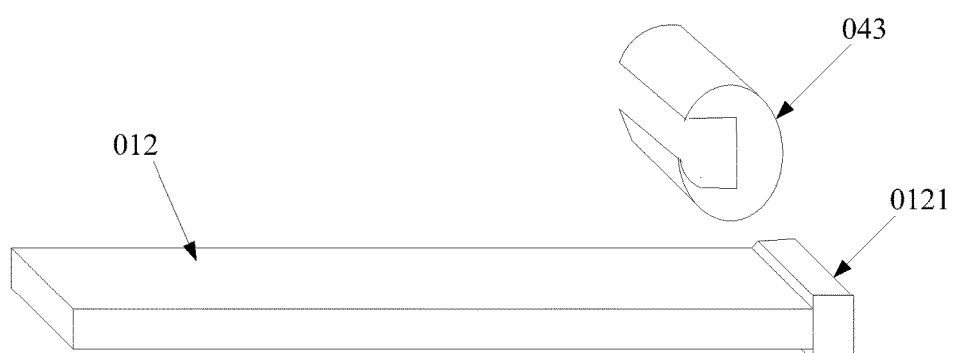
FIG. 9 is a schematic diagram of a clamping slot and a protrusion provided in an embodiment of the present invention.

It is to be noted that, the hollow structure of the clamping slot in FIG. 7-1 or FIG. 8-1 corresponds to the hollow structure of the watchband section in size, such that the protrusion of the watchband section may be tightly clamped into the hollow structure of the clamping slot. The structure of the clamping slot and the protrusion of the watchband section may be designed according to actual requirements, which are not limited by embodiments of the present invention. As shown in FIGS. 7-2 and 8-2, the inner contour and the outer contour of the clamping slot are both circular, and the longitudinal section of the protrusion of the watchband section is circular. FIG. 9 is a schematic diagram of another clamping slot and protrusion. As shown in FIG. 9, the inner contour of the clamping slot is square, the outer contour of the clamping slot is circular, and the longitudinal section of the protrusion of the watchband section is square. Alternatively, both the inner and outer contours of the clamping slot may be triangular, or may be a rhombus. Alternatively, the inner contour of the clamping slot may be circular and the outer contour of the clamping slot may be square, etc. In FIG. 9, the watchband section is denoted as 012, the protrusion is denoted as 0121, and the clamping slot is denoted as 043.

Optionally, as shown in FIG. 5, a transparent protective cover 044 is snapped on the watch body housing 04. The transparent protective cover 044 can protect the touch screen of the watch body within the watch body housing from damage. For example, the material of the transparent protective cover may be glass, diamond, plastic, etc.

It is to be noted that, the wearable device in an embodiment of the present invention is provided with a touch pen, with which a touch operation may be performed on a touch screen of a wearable device body, thus improving the precision of touch operations while at the same time enabling this wearable device to receive bodies of wearable device of different sizes. For example, when the wearable device is a watch, at least two grooves of different sizes are provided within the watch body housing connected with the watchband. The grooves may hold fast watch bodies. Thus, one watchband may receive at least two watch bodies of different sizes, solving the problem in the prior art that one watchband can hardly be compatible with watch bodies of different sizes, therefore improving the practicability of the wearable device.

It is additionally to be noted that, the wearable device in embodiments of the present invention is provided with a housing for a wearable device body, for example, a watch is provided with a watch body housing. The watch body housing can not only solve the problem that the watchband in the prior art is incompatible with watch bodies of different sizes concurrently, thus achieving the effect that one watchband may receive at least two watch bodies of different sizes, but also solve the problem that the watch body of a watch in the prior art is easy to be damaged. Because of the fragility of the watch body of a watch in the prior art, collision with the watch body may affect the appearance of the watch body, or even cause the watch to dysfunction. The watch body housing provided in embodiments of the present invention may effectively protect the watch, thus protecting the watch from damage.

In summary, embodiments of the present invention provide a wearable device. This wearable device comprises a fastening strap, a wearable device body and a housing for the wearable device body. The fastening strap is provided with at least one fastening member, each being able to fasten a touch pen to the fastening strap, with which a touch operation may be performed on a touch screen of the wearable device body. The housing for the wearable device body may receive at least two wearable device bodies of different sizes, and may effectively protect the wearable device bodies. Thus, the precision of touch operation is improved, and the practicability of the wearable device is enhanced.

An embodiment of the present invention provides a touch pen. As shown in FIG. 1, a touch pen 03 is fastened to a fastening strap 01 of a wearable device using at least one fastening member 01 provided on the fastening strap 01. The touch pen 03 is used for performing a touch operation on a touch screen of a wearable device body 02 of the wearable device.

In summary, an embodiment of the present invention provides a touch pen, which may be used for performing a touch operation on the touch screen of the wearable device body of a wearable device and may be fastened to the fastening strap of the wearable device through at least one fastening member. Compared to the prior art, the difficulty of touch operations on the touch screen is reduced. Thus, the precision of touch operations is improved, and the flexibility of touch operations is improved.

Figure 10:
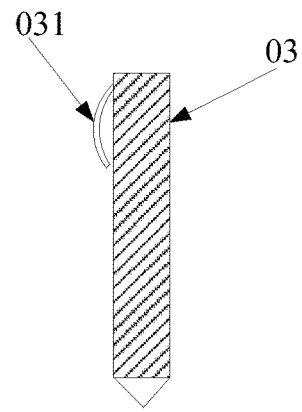
FIG. 10 is a structural schematic diagram of a touch pen provided in an embodiment of the present invention.

Optionally, as shown in FIG. 10, the touch pen 03 has an end provided with a clamping member 031, which may be clamped to the fastening member 011 in FIG. 1. The touch pen may be clamped to the fastening member of the fastening strap using the clamping member. When a touch operation needs to be performed on a touch screen, the touch pen may be taken directly from the fastening strap. Thus, flexibility of the touch operation on the touch screen is improved.

Figures 1, 11:
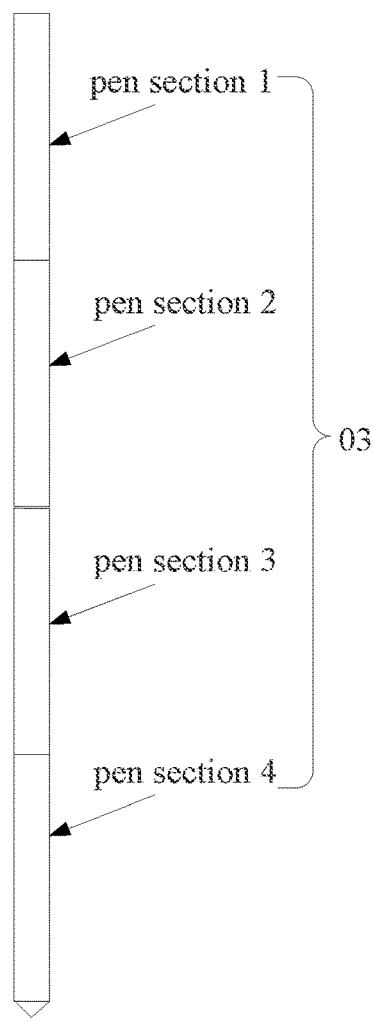
Figures 2, 11:
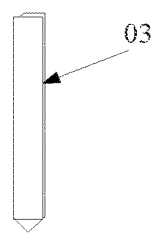

In order to be fastened to the fastening strap of the wearable device, the touch pen may be of various structures. Optionally, the touch pen comprises n pen sections, where n is greater than or equal to 2. Any two adjacent pen sections may be foldably connected. The length of the folded touch pen may be greater than or equal to the length of the longest pen section among the n pen sections. The folded touch pen may be fastened to the fastening strap using any one of the at least one fastening member. For example, FIG. 11-1 is a structural schematic diagram of a touch pen 03 before being folded which comprises 4 pen sections, which are pen sections 1, 2, 3 and 4 respectively. FIG. 11-2 is a structural schematic diagram of this touch pen 03 after being folded. FIG. 11-1 shows that any two adjacent pen sections of the touch pen may be foldably connected. If the touch pen is partially folded, e.g. the first three pen sections are folded together, the length of the folded touch pen is greater than the length of the longest pen section among the 4 pen sections. If the touch pen is completely folded, i.e. the 4 pen sections are folded together, the length of the folded touch pen is equal to the length of the longest pen section among the 4 pen sections. Preferably, the 4 pen sections have the same length. When the touch pen is to be used, the folded touch pen may be taken from the fastening strap, unfolded to an appropriate length, and then used for performing a touch operation on the touch screen of the wearable device body of the wearable device. When the touch pen is not in use, the touch pen may be folded and fastened to the fastening strap of the wearable device. When the fastening strap has multiple fastening members fixed thereon, the folded touch pen may be fastened to any location of the fastening strap of the wearable device. Alternatively, the multiple pen sections of the touch pen may be nested. The length of the nested touch pen may be greater than or equal to the length of the longest pen section among the n pen sections. When the multiple pen sections are entirely nested, the nested touch pen includes, from outward to inward, pen section 4, pen section 3, pen section 2 and pen section 1. In other words, the outer diameter of the pen section 4 is the smallest, and the outer diameter of the pen section 1 is the largest.

Figure 12:
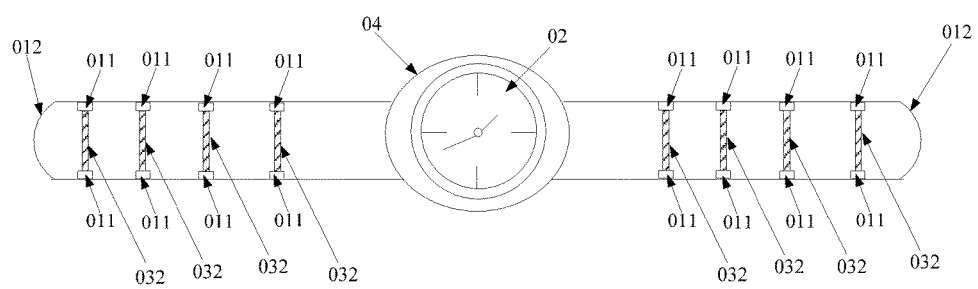
FIG. 12 is a schematic diagram of a touch pen having a combined structure provided in an embodiment of the present invention.

Optionally, the fastening strap is provided with m fastening members. The touch pen comprises n pen sections, where n is greater than or equal to 2. Any two adjacent pen sections are detachably connected. The n pen sections may be fastened to the fastening strap respectively using the m fastening members, where n is less than or equal to m. The touch pen is a combined structure, and the touch pen is detachable. FIG. 12 shows a fastening strap (i.e. watchband section) provided with 8 fastening members 011 and a touch pen comprising 8 pen sections. As shown in FIG. 12, the 8 pen sections may be respectively fastened to the fastening strap using the 8 fastening members 011. In FIG. 12, the watchband section is denoted as 012, the watch body is denoted as 02, and the watch body housing is denoted as 04. When the touch pen is to be used, the 8 pen sections may be taken from the fastening strap and combined to form a touch pen, which may be used for performing a touch operation on the touch screen of the wearable device body of the wearable device. When the touch pen is not in use, the touch pen may be detached into 8 pen sections, which are respectively fastened to the fastening strap using 8 pen fastening members. The number of the pen sections fastened to the fastening strap may be chosen according to actual requirements by a user. The more pen sections are chosen, the longer the touch pen combined is.

When the touch pen provided in an embodiment of the present invention is used for performing a touch operation on a touch screen of a wearable device body of a wearable device, in order to implement various stroke functions of the touch pen to better perform touch operations on the touch screen, the touch pen may, upon receiving a rotation signal, be capable of changing its resistance and thus adjusting its stroke function. The rotation signal is a signal generated in a rotation operation at the connection of any two adjacent pen sections of the touch pen. The stroke function is a function of variation in thickness, a function of variation in color or a function of erasing track of a stroke of the touch pen.

Further optionally, the touch screen of the wearable device body of the wearable device is typically a capacitive touch screen. In the case of a capacitive touch screen, when the touch pen is in contact with the touch screen, the nib of the touch pen and the touch screen form a coupling capacitor. A high-frequency signal provided on the touch screen causes a certain quantity of electric charges to transfer from the touch screen to the touch pen. To compensate for the loss of electric charges, electric charges are supplemented from the four corners of the touch screen. The quantity of the electric charges supplemented is in proportion to the distances of the touch point of the touch pen on the touch screen to the four corners of the touch screen. Therefore, the position of the touch point can be calculated. Therefore, the touch pen, when in contact with the touch screen, can take current from the touch screen, and by changing the resistance of the touch pen by means of a rotation of the pen sections of the touch pen, the magnitude of the current taken by the touch pen from the touch screen are changed. Finally, after performing a calculation, the adjustment of the stroke function of the touch pen is realized, achieving the effect of enriching functions of the touch pen. The stroke function may be a function of variation in thickness, a function of variation in color or a function of erasing track of a stroke of the touch pen. It should be added that, the touch pen is equivalent to a variable resistor, so a rotation of the various parts of the touch pen can change the resistance of the touch pen.

In addition, a first chip for transmitting an electromagnetic wave and a second chip for receiving an electromagnetic wave may be embedded within the touch pen. When the different sections of the touch pen are rotated, the frequency of the electromagnetic wave transmitted by the first chip may change. After the second chip receives the electromagnetic wave with the changed frequency, the electromagnetic wave may be converted into data on the wearable device body. After receiving the data, the wearable device body may adjust the stroke function of the touch pen according to the data. For example, the electromagnetic wave may be a radio wave, microwave, infrared, visible light, ultraviolet, X-rays or gamma rays.

In summary, since the touch pen provided in embodiments of the present invention may be used for performing a touch operation on a touch screen of a wearable device body of a wearable device and may be of different structures, and the touch pen can be fastened to a fastening strap of the wearable device using at least one fastening member, the difficulty of touch operations on the touch screen is reduced compared to the prior art. Thus, the precision of touch operations is improved, and the flexibility of touch operations is improved.

An embodiment of the present invention provides another touch pen. This touch pen comprises n pen sections, where n is greater than or equal to 2. The touch pen is used for performing a touch operation on a touch screen of a wearable device body of a wearable device.

In summary, the touch pen provided in an embodiment of the present invention may be used for performing a touch operation on a wearable device body of a wearable device. The difficulty of touch operations on the touch screen is reduced compared to the prior art. Thus, the precision of touch operations is improved.

The touch pen may be of different structures. Optionally, as shown in FIGS. 11-1 and 11-2, any two adjacent pen sections may be foldably connected. The length of the folded touch pen may be greater than or equal to the length of the longest pen section among the n pen sections. When the touch pen is to be used, the folded touch pen may be unfolded to an appropriate length, and the unfolded touch pen may be used for performing a touch operation on the touch screen of the wearable device body of the wearable device. When the touch pen is not in use, the touch pen may be folded and placed at a predetermined location.

Optionally, as shown in FIG. 12, any two adjacent pen sections are detachably connected. When the touch pen is to be used, the 8 pen sections may be combined to form a touch pen, which is to be used for performing a touch operation on the touch screen of the wearable device body of the wearable device. When the touch pen is not in use, the touch pen may be detached into 8 pen sections, which are then placed at predetermined locations. The number of the pen sections may be chosen according to actual requirements by the user. The more pen sections are chosen, the longer the touch pen combined is.

In order to implement various stroke functions of the touch pen for better performing touch operations on the touch screen, after receiving a rotation signal, the touch pen can change its resistance and adjust its stroke function. The rotation signal is a signal generated in a rotation operation at the connection of any two adjacent pen sections of the touch pen. For example, the stroke function may be a function of variation in thickness, a function of variation in color or a function of erasing track of a stroke of the touch pen. For example, the rotation of different parts of the touch pen may change the resistance of the touch pen, thus adjusting the stroke function of the touch pen. In another example, a chip for transmitting an electromagnetic wave and a chip for receiving the electromagnetic wave may be embedded within the touch pen. In this case, the rotation of different parts of the touch pen may change the frequency of the electromagnetic wave, thus adjusting the stroke function of the touch pen.

In summary, embodiments of the present invention provide a touch pen, which may be used for performing a touch operation on the touch screen of the wearable device body of the wearable device and may be of different structures. The difficulty of touch operations on the touch screen is reduced compared to the prior art. Thus, the precision of touch operations is improved, and the flexibility of touch operations is improved.

The above description of exemplary embodiments of the present invention is merely illustrative, and not to limit the invention. Any modifications, equivalences and improvements within the spirit and principle of the present invention should be included in the scope of the invention.

The invention claimed is:

1. A wearable device, comprising:
a fastening strap including two watchband sections;
a watch body connected to the fastening strap, wherein the fastening strap includes at least one fastening member configured to fasten a touch pen to the fastening strap, the touch pen is configured for performing a touch operation on a touch screen of the watch body, and the fastening strap and the watch body form an enclosed circle; and
a watch body housing configured to receive the watch body, wherein:
the watch body housing includes an axial symmetric structure, a side of the watch body housing includes two clamping slots that are symmetrical with respect to an axial section of the watch body housing, and each of the two watchband sections includes an end including a protrusion clamped into its corresponding clamping slot to movably connect the watch body housing and the two watchband sections;
each clamping slot includes a tubular structure having an opening in a side of the tubular structure, each protrusion includes a cylindrical structure, and an inner diameter of each clamping slot is greater than or equal to an outer diameter of its corresponding protrusion; and
first magnets are positioned on an inner surface of each clamping slot, second magnets are positioned on an outer surface of each protrusion, and a polarity of the first magnets is opposite to a polarity of the second magnets.

2. The wearable device according to claim 1, wherein the fastening member includes a tubular structure fixedly attached on a side of the fastening member, and an inner diameter of the fastening member is greater than or equal to an outer diameter of the touch pen for inserting the touch pen into the fastening member.

3. The wearable device according to claim 2, wherein the fastening member includes elastic material.

4. The wearable device according to claim 1, wherein the fastening member comprises two clamping members each fixedly attached to the fastening strap, and the touch pen is clamped to the clamping members.

5. The wearable device according to claim 1, wherein:
the wearable device comprises a watch, and the fastening strap comprises a watchband; and
the watchband sections and the watch body form an enclosed circle.

6. The wearable device according to claim 5, wherein the watch body housing includes at least two nested grooves, heights of the at least two nested grooves decrease from outward to inward in the watch body housing, each of the grooves is enclosed by a sidewall and a bottom surface of the watch body housing, and at least two watch bodies of different sizes are disposed within the watch body housing through the at least two nested grooves.

7. The wearable device according to claim 6, wherein:
each clamping slot includes a pin and its corresponding protrusion includes a pin hole, and the pin is inserted into the pin hole.

8. The wearable device according claim 5, further comprising a transparent protective cover snapped on the watch body housing.

9. The wearable device of claim 1, further comprising the touch pen fastened to the fastening strap through the at least one fastening member, the touch pen configured for performing the touch operation on the touch screen of the watch body.

10. The wearable device according to claim 9, wherein the touch pen includes an end including a clamping member, the clamping member clamped onto the fastening member.

11. The wearable device according to claim 10, wherein the touch pen includes n pen sections, n is greater than or equal to 2, any two adjacent pen sections are foldably connected, a length of the folded touch pen is greater than or equal to a length of a longest pen section among the n pen sections, and the folded touch pen is to the fastening strap through any of the at least one fastening member(s).

12. The wearable device according to claim 11, wherein the touch pen is configured to, after receiving a rotation signal, change its resistance and adjust its stroke function, the rotation signal includes a signal generated in a rotation operation at a connection of any two adjacent pen sections of the touch pen, and the stroke function includes a function of variation in thickness, a function of variation in color or a function of erasing a track of a stroke of the touch pen.

13. The wearable device according to claim 10, wherein the fastening strap includes m fastening members, the touch pen includes n pen sections, n is greater than or equal to 2, any two adjacent pen sections are detachably connected, the n pen sections are fastened to the fastening strap through the m fastening members, and n is less than or equal to m.

14. The wearable device of claim 1, further comprising the touch pen, wherein the touch pen includes n pen sections, n is greater than or equal to 2, and the touch pen is configured to perform the touch operation on the touch screen of the watch body.

15. The wearable device according to claim 14, wherein any two adjacent pen sections are foldably connected, and a length of the folded touch pen is greater than or equal to a length of the longest pen section among the n pen sections.

16. The wearable device according to claim 15, wherein the touch pen is configured to, after receiving a rotation signal, change its resistance and adjust its stroke function, the rotation signal includes a signal generated in a rotation operation at a connection of any two adjacent pen sections of the touch pen, and the stroke function includes a function of variation in thickness, a function of variation in color or a function of erasing a track of a stroke of the touch pen.

17. The wearable device according to claim 14, wherein any two adjacent pen sections are detachably connected.

* * * * *